(12) United States Patent
Hobbs et al.

(10) Patent No.: US 10,432,451 B2
(45) Date of Patent: Oct. 1, 2019

(54) SYSTEMS AND METHODS FOR MANAGING NETWORK HEALTH

(71) Applicant: Level 3 Communications, LLC, Broomfield, CO (US)

(72) Inventors: Orville J. Hobbs, Castle Rock, CO (US); Charles A. Lockwood, Parker, CO (US); Scott C. Mellecker, Arvada, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 312 days.

(21) Appl. No.: 14/825,676

(22) Filed: Aug. 13, 2015

(65) Prior Publication Data

US 2017/0048099 A1 Feb. 16, 2017

(51) Int. Cl.
*H04L 12/24* (2006.01)

(52) U.S. Cl.
CPC ........ *H04L 41/065* (2013.01); *H04L 41/0654* (2013.01)

(58) Field of Classification Search
CPC ............... H04L 41/0631; H04L 41/064; H04L 41/0609
See application file for complete search history.

(56) References Cited

U.S. PATENT DOCUMENTS

| | | | |
|---|---|---|---|
| 5,832,196 A | 11/1998 | Croslin et al. | |
| 6,549,128 B1 | 4/2003 | Smith et al. | |
| 6,671,818 B1 | 12/2003 | Mikurak | |
| 7,080,141 B1 | 7/2006 | Baekelmans | |
| 8,015,278 B1 * | 9/2011 | Papa | H04L 41/0645 709/223 |
| 8,059,548 B1 | 11/2011 | Bisarya | |
| 9,331,897 B2 * | 5/2016 | Hassett | H04L 41/0654 |
| 2002/0111755 A1 | 8/2002 | Valadarsky et al. | |
| 2005/0099419 A1 | 5/2005 | Castonguay et al. | |
| 2006/0277299 A1 | 12/2006 | Baekelmans et al. | |

(Continued)

FOREIGN PATENT DOCUMENTS

| | | | | |
|---|---|---|---|---|
| EP | 1521396 | | 4/2005 | |
| IN | 2554/DEL/2014 | * | 9/2014 | ............. H04L 12/26 |

OTHER PUBLICATIONS

U.S. Appl. No. 14/825,730, filed Aug. 13, 2015, Hobbs et al.

(Continued)

*Primary Examiner* — Jeffrey M Rutkowski
*Assistant Examiner* — Chae S Lee

(57) ABSTRACT

Implementations described and claimed herein provide systems and methods systems and methods for managing network health, including alarm reduction in a subnetwork. In one implementation, an alarm list is received. The alarm list has alarm data captured from a plurality of remote nodes and consolidated at an aggregator node. A first alarm corresponding to an optical interface deployed in a circuit of a telecommunications subnetwork is identified from the alarm list. A topology associated with the optical interface is discovered by traversing a path of the circuit. An interface list is generated based on the topology. One or more alarms related to a root cause of the first alarm are identified based on a comparison of the interface list to the alarm list. The related alarms are correlated to the first alarm for concurrent resolution.

26 Claims, 11 Drawing Sheets

(56) References Cited

U.S. PATENT DOCUMENTS

| | | | |
|---|---|---|---|
| 2008/0155327 | A1 | 6/2008 | Black et al. |
| 2008/0294989 | A1 | 11/2008 | Ceruti et al. |
| 2010/0005471 | A1 | 1/2010 | Jethani et al. |
| 2010/0189016 | A1 | 7/2010 | Millet |
| 2011/0047262 | A1 | 2/2011 | Martin |
| 2011/0116387 | A1 | 5/2011 | Beeco et al. |
| 2012/0226807 | A1 | 9/2012 | Panella et al. |
| 2013/0176858 | A1 | 7/2013 | Zee |
| 2013/0283095 | A1 | 10/2013 | Dhuse et al. |
| 2014/0379895 | A1* | 12/2014 | Jain .................... H04L 41/0654 709/224 |
| 2015/0032834 | A1* | 1/2015 | Chan .................. H04L 41/0604 709/208 |
| 2016/0072688 | A1* | 3/2016 | Desai ................... H04L 41/065 709/224 |
| 2016/0080218 | A1 | 3/2016 | Matthews et al. |
| 2016/0182275 | A1* | 6/2016 | Viswanadham ... H04B 10/0771 398/1 |

OTHER PUBLICATIONS

International Search Report dated Sep. 23, 2016, Int'l Appl. No. PCT/US16/039628, Int'l Filing Date Jun. 27, 2016; 3 pgs.
Written Opinion of the International Searching Authority dated Sep. 23, 2016, Int'l Appl. No. PCT/US16/039628, Int'l Filing Date Jun. 27, 2016; 12 pgs.
International Search Report dated Oct. 28, 2016, Int'l Appl. No. PCT/US16/039527, Int'l Filing Date Jun. 27, 2016; 5 pgs.
Written Opinion of the International Searching Authority dated Oct. 28, 2016, Int'l Appl. No. PCT/US16/039527, Int'l Filing Date Jun. 27, 2016; 8 pgs.
International Preliminary Report on Patentability dated Feb. 13, 2018, Int'l Appl. No. PCT/US16/039527, Int'l Filing Date Jun. 27, 2016; 10 pgs.
International Preliminary Report on Patentability dated Feb. 13, 2018, Int'l Appl. No. PCT/US16/39628, Int'l Filing Date Jun. 27, 2016; 14 pgs.
European Partial Supplementary Examination Report, dated Dec. 19, 2018, Application No. 16835572.5, filed Jun. 27, 2016; 11 pgs.

* cited by examiner

SYSTEMS AND METHODS FOR MANAGING NETWORK HEALTH

TECHNICAL FIELD

Aspects of the present disclosure relate to network health management, among other features and advantages, and in particular to network alarm reduction and the identification and resolution of network issues.

BACKGROUND

Industries providing services involving a complex technical infrastructure, such as the telecommunications industry, are faced with unique challenges in meeting customer expectations and maintaining customer satisfaction. For example, a network outage or similar service event may disrupt or otherwise impair telecommunication services, thereby impacting customer satisfaction. To identify potential service events, alarms are often utilized to prompt resolution. Conventional methods manually investigate and address such alarms. Services involving complex technical infrastructures, however, can be faced with over one million alarms at any one time. With such a volume of alarms, manually investigating and addressing each alarm expends significant time and resources.

Alarms in the telecommunications industry are often related to network provisioning activities, such as customer ordered disconnects, groom work, and the like, and are thus false alarms in a sense or otherwise easy to resolve. Manually investigating alarms related to provisioning activities is often impeded by a cluster of information in attempting to trace the alarm through the network path to its root cause and to address additional alarms tied to the root cause. However, provisioning issues typically do not directly impact service for current customers and are therefore a lower priority than resolving other network issues. Due to the tremendous resources needed to address all network alarms, lower priority alarms, such as those related to provisioning issues, are often left unaddressed, thereby underutilizing deployed network assets and increasing the volume of alarms.

It is with these observations in mind, among others, that various aspects of the present disclosure were conceived and developed.

SUMMARY

Implementations described and claimed herein address the foregoing problems, among others, by providing systems and methods for managing network health. In one implementation, an alarm list is received. The alarm list has alarm data captured from a plurality of remote nodes and consolidated at an aggregator node. A first alarm corresponding to an optical interface deployed in a circuit of a telecommunications subnetwork is identified from the alarm list. A topology associated with the optical interface is discovered by traversing a path of the circuit. An interface list is generated based on the topology. One or more alarms related to a root cause of the first alarm are identified based on a comparison of the interface list to the alarm list. The related alarms are correlated to the first alarm for concurrent resolution.

In another implementation, a ticket for a plurality of correlated alarms is generated. Each of the correlated alarms is associated with a network element deployed along a circuit path in a subnetwork of a telecommunications network. Cross connect data from each of the network elements is obtained. An integrity of the circuit path through the network elements is determined using the cross connect data. A priority for resolving the ticket is determined based on the integrity of the network elements. The priority specifies an impact potential on the subnetwork.

In one implementation, an alarm list for a subnetwork of a telecommunucations network is obtained. The alarm list has alarm data captured from a plurality of network elements forming the subnetwork. Network data associated with a subset of the network elements is captured by traversing a circuit path in the subnetwork from a source to a destination. The subset of network elements disposed is along the circuit path. The alarm list is correlated with the network data to identify a related network issue. A root cause of the related network issue is determined. One or more recommendations for resolving the root cause of the related network issue are generated, and at least one of the recommendations is deployed in the subnetwork.

In another implementation, alarm data captured from a plurality of network elements in a subnetwork of a telecommunications network is obtained, and network data associated with the plurality of network elements is obtained. The alarm data and the network data are stored in one or more databases. The alarm data is correlated with the network data based on one or more circuit paths created by the plurality of network elements in the subnetwork. Network health data is generated based on the correlated data.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the present disclosure involve systems and methods for managing network health. Generally, a network health manager takes a snapshot of alarms in a subnetwork, captures data associated with the alarms, and generates recommendations for addressing the root cause of the alarms, such as repairing network services and/or removing cross connects from network elements. Consequently, the number of alarms in the network is reduced, network issues are identified and resolved, a quick reference to equipment logs is created for evaluation, and network assets are recovered.

In one aspect, the network health manager obtains an alarm list for a subnetwork. The alarm list contains alarm data from each of the nodes in the subnetwork. The network health manager obtains network data, including, without limitation, topology data, cross connect data, and ring data reflecting a slice of the subnetwork. Using the alarm list and the network data, the network manager creates a ticket for one alarm and correlates related alarms into the ticket. The network health manager generates one or more commands and sends the commands through an aggregator node to a plurality of remote nodes in the subnetwork. In response to the commands, the network health manager receives cross connect data pertaining to the ticket. The network health manager determines a status and integrity of the circuit path flowing through the nodes in the subnetwork based on the cross connect data. The tickets may be prioritized according to a potential impact on network clean-up. The network health manager generates recommendations for addressing the root cause of the related alarms based on the status and integrity of the nodes. The network health manager may deploy one or more of the recommendations. For example, the network health manager may generate a resolution script to address the root cause of the alarms. Alternatively or additionally, the network health manager may prompt a user to deploy one or more of the recommendations.

The various systems and methods disclosed herein generally provide for network health management. The example implementations discussed herein reference the telecommunication industry and addressing alarms in networks providing telecommunication services. However, it will be appreciated by those skilled in the art that the presently disclosed technology is applicable to other industries, services, and network issues.

Figure 1:
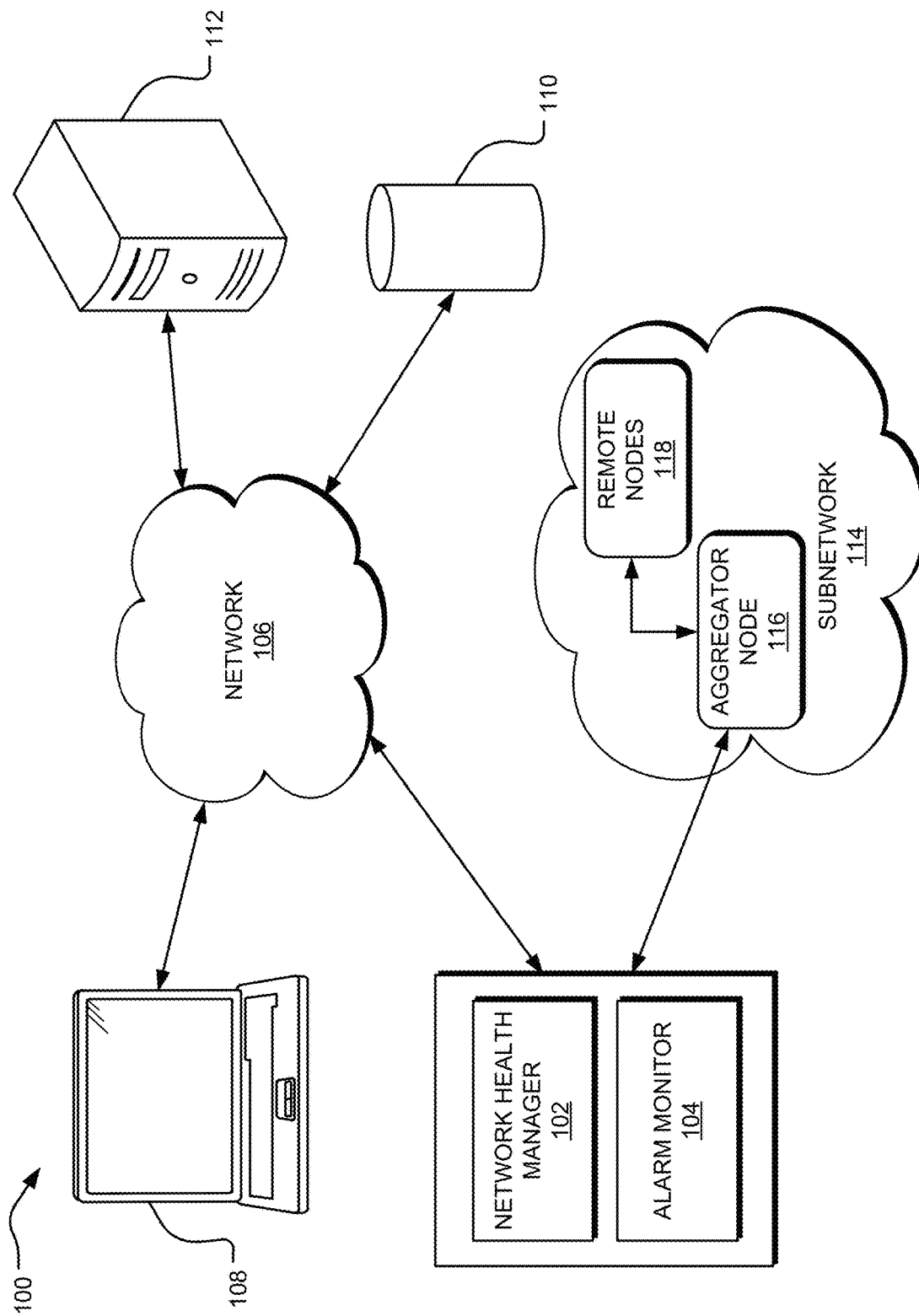
FIG. 1 shows an example network environment, including a network health manager running on at least one server or other computing device coupled with a network, for network alarm reduction and identifying and resolving network issues.

For a detailed description of an example network environment 100 for network alarm reduction and identifying and resolving network issues, reference is made to FIG. 1. In one implementation, a network health manager 102 is in communication with an alarm monitor 104 and other network components via a network 106, which may be any computing network, including, without limitation, the Internet, a local intranet, a Virtual Private Network (VPN), and/or the like. The alarm monitor 104 may be part of or separate from the network health manager 102.

In one implementation, a user accesses and interacts with the network health manager 102 and/or the alarm monitor 104 using a user device 108 to obtain a snapshot of alarms and respond accordingly. The user may be any authorized personnel, such as a service engineer, a representative of one or more teams in various departments, or an internal or external network health auditor.

The user device 108 is generally any form of computing device capable of interacting with the network 106, such as a personal computer, terminal, workstation, portable computer, mobile device, tablet, multimedia console, etc. The network 106 is used by one or more computing or data storage devices (e.g., one or more databases 110 or other computing units described herein) for implementing the network health manager 102 and other services, applications, or modules in the network environment 100.

In one implementation, the network 106 includes at least one server 112 hosting a website or an application that the user may visit to access the network health manager 102, the alarm monitor 104, and/or other network components. The server 112 may be a single server, a plurality of servers with each such server being a physical server or a virtual machine, or a collection of both physical servers and virtual machines. In another implementation, a cloud hosts one or more components of the network environment 100. The user devices 108, the server 112, and other resources connected to the network 106 may access one or more other servers to access to one or more websites, applications, web services interfaces, storage devices, computing devices, or the like that are used for network alarm investigation, analysis, and resolution. The server 112 may also host a search engine that the network health manager 102 uses for accessing, searching for, and modifying tickets, alarm lists, network data, network health data, resolution scripts, and other data.

As can be understood from FIG. 1, in one implementation, the network health manager 102 determines a root cause and severity of a network issue in one or more subnetworks 114, which maximizes resources and prioritizes an alarm queue for remedy. Stated differently, the network health manager 102 correlates and reduces alarms in the subnetwork 114, evaluates customer circuits for present status, determines an integrity and status of carriers and facilities, identifies and resolves network issues, and optimizes network health. Stated differently, the network health manager 102 determines whether there is an intact circuit or a carrier. For the intact circuit, the network health manager 102 determines whether the circuit is its own intact entity from an origin point to a termination point. For the carrier, the network health manager 102 identifies each constituent along a circuit path and traverses the circuit path to a termination point to determine an integrity of each constituent.

The network health manager 102 receives an alarm list for the subnetwork 114, which has a plurality of optically connected nodes (e.g., Optical-Electrical-Optical (OEO) nodes). For example, the subnetwork 114 may include one or more rings (i.e., one or more slices of the subnetwork), each having a plurality of remote nodes 118 connected to an aggregator node 116. The optically connected nodes interconnect circuits between rings within the subnetwork 114. In one implementation, the network health manager 102 receives the alarm list from the alarm monitor 104, which generates the alarm list using alarm data captured from each of the nodes 116-118 in the subnetwork 114. In another implementation, the network health manager 102 captures the alarm data directly and generates the alarm list. For example, each of the remote nodes 118 may be configured to autonomously generate alarm data in response to a network issue and report the alarm data to the aggregator node 116 for collection. The network health manager 102 receives the alarm data from each of the aggregator nodes 116 in the subnetwork 114 directly or indirectly (e.g., via the alarm monitor 104) and generates the alarm list for the subnetwork 114. In one implementation, the alarm list and captured alarm data is stored in the one or more databases 110.

Networks described herein, particularly telecommunications networks, are vast and complex with intricate changes being regularly made to various portions of a network to accommodate numerous customers. Moreover, networks are inherently susceptible to uncontrollable service events, such as outages, fiber cuts, and the like. The prevalence of alarms in a network is thus an unavoidable reality flowing from these characteristics of networks, rather than a representation of inadequate workmanship.

Accordingly, an alarm in the subnetwork 114 may correspond to a variety of network issues having different root causes. For example, a large portion of the alarms in the subnetwork 114 often correspond to provisioning network issues having impairments resulting from the provision of network services for one or more customers. Such impairments may include, without limitation, circuits improperly disconnected, stranded cross connects, unidirectional passthroughs, missing passthroughs, incomplete add/drop terminations, unprotected or improper drops, missing or improperly provisioned protections, improper OEO connections, improper passthrough connects affecting interface switching, and/or ports left in alarm after a circuit was disconnected. Generally, provisioning network issues involve disconnects, circuit paths built incorrectly, impairments following removal of a portion of a circuit, impairments following groom work, and/or the like. Grooming typically involves a change in a circuit path, at an origination point, a termination point, or somewhere in between of the overall end to end circuit.

In one implementation, the network health manager 102 analyzes alarms from a network perspective, rather than a database perspective, to correlate alarms having a related network issue and remedy the root cause and recover network assets. To correlate related alarms, the network health manager 102 identifies a first alarm corresponding to an interface of an optical node in the subnetwork 114. The network health manager 102 traverses a path of the circuit involving the interface from source to destination to discover a topology of the circuit. In one implementation, the network health manager 102 generates a query (e.g., using one or more Transaction Language 1 (TL1) commands) to the interface to identify neighboring interfaces, and the network health manager 102 continues along the circuit path identifying and tracking each of the interfaces deployed in the circuit in an interface list. The network health manager 102 compares the interface list to the alarm list to determine whether any of the other interfaces discovered along the circuit path are in alarm and tags the corresponding alarms with a tag assigned to the first alarm. The tags provide an indication that the alarms are likely related and share a root cause. Thus, the root cause of the related alarms may be determined and resolved concurrently. In one implementation, the network health manager 102 correlates related alarms into a single ticket to identify and resolve the root cause of the related alarms by addressing the single ticket. As such, a portion of the alarms in the subnetwork 114 may all be cleared concurrently.

For example, a circuit may be inadvertently only partially removed in response to a disconnect request from a customer. Circuits typically comprise sections, and with the complexity and expansiveness of telecommunications networks, it is easy to overlook one of the sections when deleting a circuit. As a result of the disconnect, the remaining cross connects deployed along the circuit path have related alarms because the circuit does not have a drop connection and thus cannot carry traffic. The network health manager 102 verifies that the circuit cannot carry traffic by tracing through the interfaces along the circuit path and identifies the improperly disconnected circuit as the root cause by locating the missing drop connection. The network health manager 102 then recommends removing the remaining cross connects to properly remove the circuit. The remaining cross connects may be automatically removed, for example, using a resolution script generated by the network health manager 102, or removed in response to user input. Removing the cross connects to complete the disconnect clears the alarms concurrently and recovers network assets in ports.

Similarly, a delay in properly performing a customer disconnect may cause several related alarms in a subnetwork. In particular, the interfaces deployed along the circuit path expect to receive a signal, and because the customer disconnect removed the signal, the interfaces have related alarms. As described above, the network health manager 102 verifies that the interfaces are capable of carrying service and are deployed in a circuit no longer carrying service. The network health manager 102 recommends removing the remaining cross connects, which may be done automatically or in response to user input. Removing the cross connects to complete the disconnect clears the alarms concurrently and recovers network assets in ports. The network health manager 102 thus filters the alarm list to identify and remedy such service affecting alarms to recover network assets that are capable of carrying service but deployed in a circuit that is no longer carrying service.

An integrity of a circuit path through individual nodes within a working circuit may also correspond to one or more alarms. For example, an existing cross connect may be inadvertently deleted from a working circuit. Deleting the cross connect removes part of the circuit, resulting in related alarms for interfaces along the circuit path downward from the deleted cross connect. The network health manager 102 verifies that the circuit is capable of carrying traffic by tracing through the interfaces along the circuit path and identifies the improperly deleted cross connect as the root cause. Stated differently, the network health manager 102 determines that there is a working circuit with alarms throughout that are caused by the missing cross connect. The network health manager 102 then recommends adding the missing cross connect, which may be done automatically or in response to user input. Adding the missing cross connect clears the alarms concurrently.

Similarly, a cross connect may be properly deleted but the port was inadvertently not placed out of service. After verifying that the presence of no cross connect with a live port, the network health manager 102 recommends placing the port out of service and executes the recommendation automatically or in response to user input.

These examples demonstrate the alarm reduction and network asset recovery advantages of the network health manager 102. As detailed herein, the network health manager 102 discovers a circuit design, correlates related alarms for the circuit design, and using this information prioritizes which set of related alarms to address first based on an impact potential on the subnetwork 114. For example, the impact potential on the subnetwork 114 may correspond to a level of alarm reduction in the subnetwork 114, an amount of network assets recoverable, a level of network service remediation, and/or the like.

In addition to alarm reduction and network asset recovery, the network health manager 102 proactively identifies potential network issues, resolves the issues before service is impacted, and otherwise optimizes network health. In one implementation, network issues currently present in the subnetwork 114 on an inactive path of a protected service, which would fail a customer's service during service events, such as power failures, scheduled maintenance activities, or equipment failures, are similarly identified and resolved by the network health manager 102. For example, the network health manager 102 may identify a network issue, such as a missing protection, a potential outage, a fiber cut, or similar issue with the potential to impact service to one or more customers, and remedy the root cause of the issue proactively before the customer is impacted. Stated differently, the network health manager 102 automatically identifies opportunities for optimizing network health and takes action to proactively execute those opportunities, thereby minimizing the potential for future network issues impacting customer service.

Additionally, in one implementation, the network health manager 102 optimizes network health by facilitating network clean-up. For example, the network health manager 102 filters and prioritizes one or more tickets in an alarm queue. Tickets with issues assigned a higher priority may correspond to network issues directly impairing or disabling customer service, such as a loss of a signal, fiber cuts, outages, and/or the like. The network health manager 102 may prompt a user to address the higher priority tickets while automatically resolving network issues corresponding to tickets, for example, those involving provisioning network issues.

In one implementation, the network health manager 102 generates a resolution script with instructions for making changes in the subnetwork to address network issues, such as provisioning network issues. For example, to generate the resolution script, the network health manager 102 may compile instructions into a file for which TL1 commands to send to the nodes 116-118 in the subnetwork 114 to clear the network issues identified. The network health manager 102 may autonomously identify the root causes of lower priority network issues, generate resolution scripts for addressing the root causes, and execute the resolution scripts in the subnetwork 114. Alternatively, the network health manager 102 may generate recommendations for resolving the network issues and prompt a user to determine whether to execute the recommendation. For example, the resolution script may include one or more commands to network elements (e.g., the nodes 116-118) in the subnetwork 114 to remove circuits or cross connects left following a groom, a customer disconnect, an improper or incomplete disconnect, or otherwise associated with an alarm ticket. The network health manager 102 may further index equipment logs by circuit, thereby providing a quick reference to assist in network evaluation.

Figure 2:
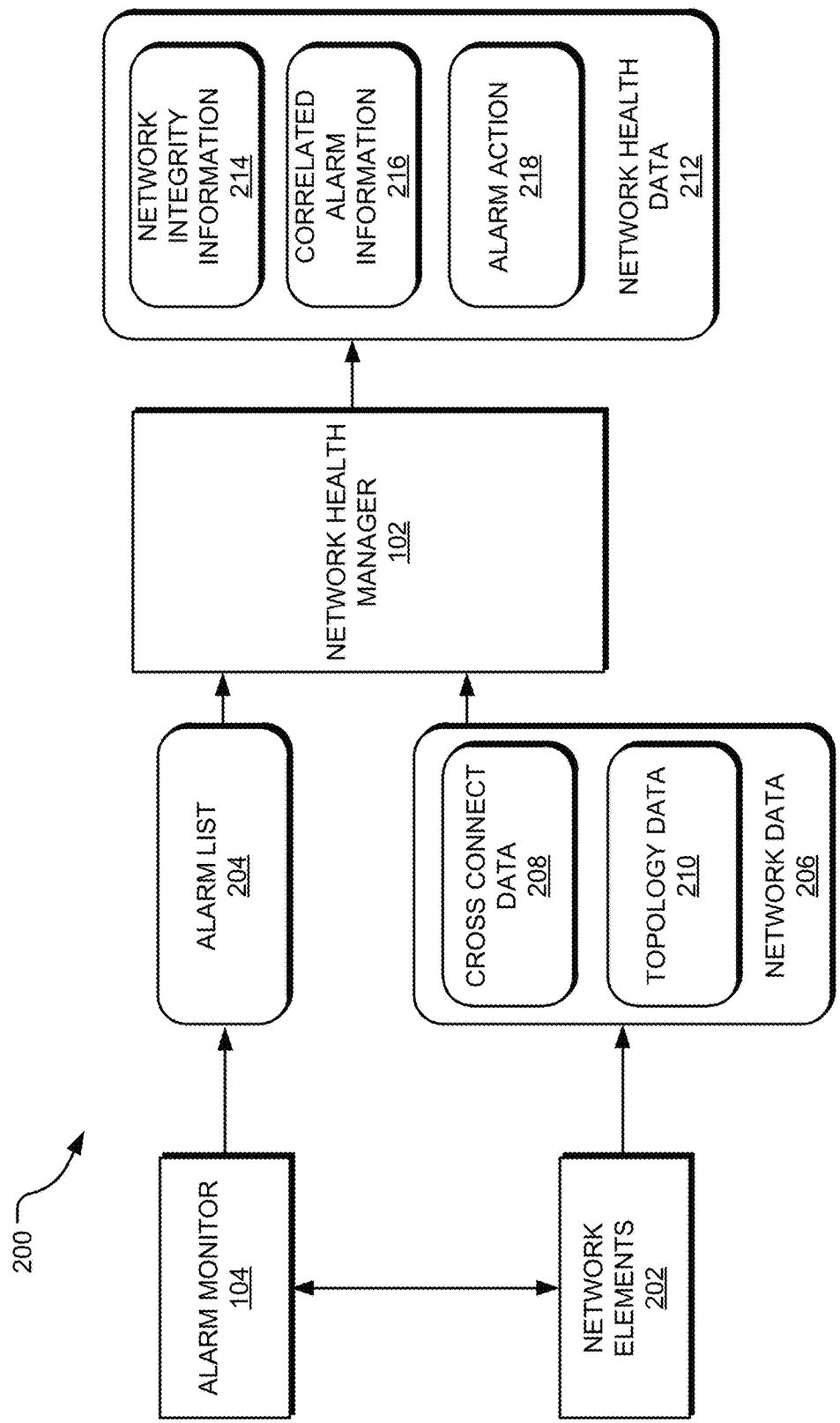
FIG. 2 is a block diagram depicting data obtained by the network health manager to generate network health data.

Turning to FIG. 2, a block diagram 200 depicting data obtained by the network health manager 102 is shown. In one implementation, the network health manager 102 is in communication with the alarm monitor 104 and a plurality of network elements 202 deployed in a subnetwork. The network elements 202 may include optical nodes, each having one or more interfaces, as detailed herein, and any other network devices deployed in the subnetwork. For example, the network elements 202 may comprise a plurality of remote nodes optically connected to an aggregator node in a ring topology, and multiple rings may be interconnected along a circuit path from a source to a destination.

In one implementation, the network health manager 102 receives an alarm list 204 having alarm data captured from the network elements 202. The network health manager 102 may obtain the alarm data to generate the alarm list 204 directly from the network elements 202 or using the alarm monitor 104. In one implementation, the alarm monitor 104 is an element management system configured to monitor the network deployed in the network elements 202. Each of the network elements 202 communicates with the alarm monitor 104 to report alarms, and the alarm monitor 104 generates the alarm list 204. Stated differently, each of the network elements 200 autonomously detects a network issue and generates a message including alarm data, which is captured by the alarm monitor 104 and consolidated into the alarm list 204. In one implementation, each remote network element reports alarm data through a Gateway Network Element (GNE) to the alarm monitor 104, with the alarm data being consolidated at the GNE for communication to the alarm monitor 104.

The network health manager 102 identifies a first alarm corresponding to an optical interface of the network elements 202 from the alarm list 204, and the network health manager 102 obtains network data 206 associated with a circuit involving the optical interface. In one implementation, the alarm list 204 and the network data 206 are stored in the one or more databases 110 for access and modification. The network data 206 may include, without limitation, cross connect data 208, topology data 210, and the like.

In one implementation, the network health manager 102 discovers a topology, cross connections, and/or ring data associated with the optical interface corresponding to the first alarm using the topology data 210 and the cross connect data 208. The network data 206 may be obtained from the network elements 202 using one or more commands (e.g., TL1 commands). In one implementation, the network health manger 102 generates an interface list based on the topology of the circuit associated with the optical interface using the network data 206. The network health manager 102 compares the interface list to the alarm list 204 and identifies one or more alarms related to a root cause of the first alarm. The network health manager 102 correlates the related alarms to the first alarm for concurrent resolution. The related alarms and the first alarm may be correlated into a ticket or otherwise using a tag. By concurrently resolving related alarms, the network health manager 102 reduces alarms in the subnetwork.

The network health manager 102 may further reduce alarms in the subnetwork by resolving related alarms based on priority. In one implementation, the network health manager 102 generates a ticket for a plurality of correlated alarms associated with a subset of the network elements 202 deployed along a circuit path in the subnetwork. The cross connect data 208 is obtained for each of the network elements 200 in the subset, with which the network health manager 102 determines an integrity of a circuit path through the network elements 200. In one implementation, the integrity of the network elements 200 includes: a status of the carrier for the circuit path indicating whether the carrier is carrying service; a status of each of the network elements 200 indicating whether it is capable of carrying service; and/or the like. Based on the integrity of the network elements 200 deployed along the circuit path, the network health manager 102 determines a priority for resolving the ticket. In one implementation, the priority corresponds to an impact potential on the subnetwork. For example, the impact potential on the subnetwork may correspond to a level of alarm reduction in the subnetwork, an amount of network assets recoverable, a level of network service remediation, and/or the like.

As described herein, in addition to alarm reduction, the network health manager 102 optimizes network health. In one implementation, the network health manager 102 obtains the alarm list 204 for a subnetwork and the network data 206 associated with the network elements 200 disposed along one or more circuit path in the subnetwork. Using the alarm list 204 and the network data 206, the network health manager 102 generates network health data 212. In one implementation, the network health manager 102 correlates the alarm list 204 with the network data 206 based on the circuit paths in the subnetwork, and the network health data 212 is generated based on the correlated data.

In one implementation, the network health data 212 includes network integrity information 214, correlated alarm information 216, and alarm action 218. The network integrity information 214 may include a status of carriers associated with the circuit paths and/or a status of each of the network elements 200. Stated differently, the network integrity information 214 may include a status of individual circuits and/or of carriers and the integrity of the constituents of the carriers. The correlated alarm information 216 may include a plurality of alarms related by a root cause, such as: an improperly disconnected circuit; a stranded cross connect; a unidirectional passthrough; a missing passthrough; an incomplete add/drop termination; a missing protection; an improperly provisioned protection; an improper passthrough connection affecting interface switching; and/or a port left in alarm after a circuit was disconnected. The alarm action 218 may include one or more recommendations for resolving a network issue associated with at least one of the circuit paths. The recommendations may be deployed in the subnetwork automatically, for example, using a resolution script, or in response to user input. The alarm action 218 may include recommendations, such as: deleting one of the subset of network elements; deleting the subset of network elements; deleting a carrier associated with the circuit path; placing one or more ports in auto; and/or making one or more optical interfaces associated with at least one of the subset of network elements unswitched.

Figure 3:
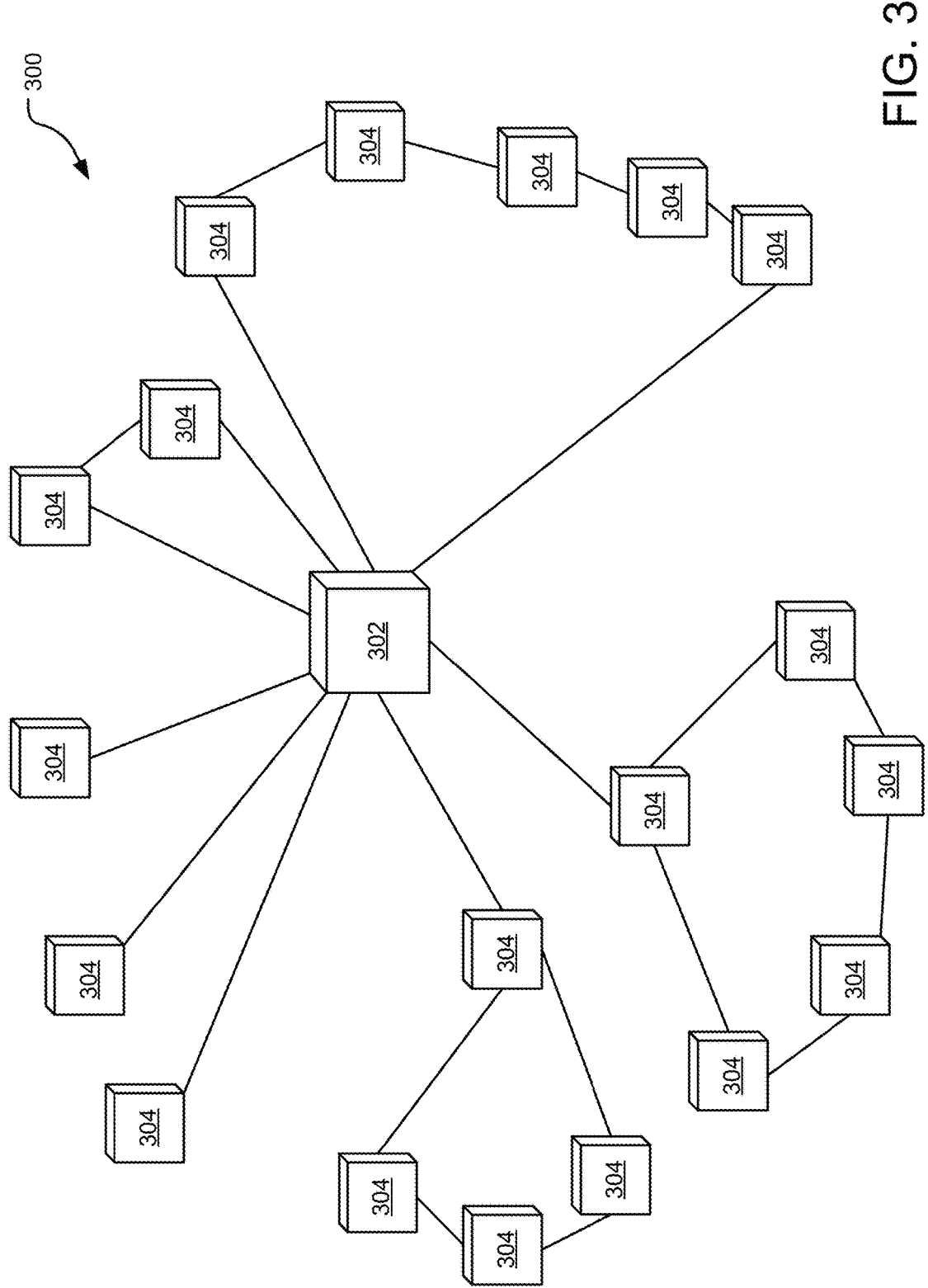
FIG. 3 illustrates an example subnetwork comprising a collection of optically connected nodes.

For a detailed description of an example subnetwork 300 comprising a collection of optically connected nodes 302 and 304, reference is made to FIG. 3. In one implementation, the subnetwork includes at least one aggregator node 302 connected to a plurality of remote nodes 304. The subnetwork 300 may have the nodes 302 and 304 arranged in a ring or bus topology. In one implementation, each of the aggregator nodes 302 allows a circuit to interconnect between rings. The subnetwork 300 may be a fiber optic network with the nodes 302 and 304 optically connected using fiber.

In one implementation, the aggregator node 302 is a communication network gateway coupling the remote nodes 304 to a network, such as a wide area network (WAN), backbone network, or other communication network or portion thereof. The subnetwork 300 may include various switches, routers, and other network components commonly found in communication networks. In one implementation, the remote nodes 304 correspond to service delivery points where one or more multiplexers (MUXs) are employed for multiplexing communication network data traffic, such as voice or data traffic, from multiple customer sites into a single data channel or connection. Stayed differently, a multiplexer generally receives multiple data channels of incoming data and directs the channels into a single output line or channel for transmission over a communication network.

The remote nodes 304 may each include a plurality of interfaces, each of which corresponding to a customer site, such that an interface may receive data over an input data channel associated with the customer site. In this case, the remote node 304 multiplexes the received data from the input data channel onto a single output data channel for transmission to the aggregator node 302. At least one of the remote nodes 304 may operate as a demultiplexer by receiving data over a single input data channel and demultiplexing the data onto multiple output channels, with each output channel transmitted to a customer site. In one implementation, the nodes 302, 304 include optical cross connects for switching high-speed optical signals in the subnetwork 300. The cross connects may include passthroughs, adds, drops, inter-ring cross connects, and the like.

As described herein, slices of the subnetwork 300 may have a ring topology with the aggregator nodes 302 interconnecting rings. In one implementation, the network health manger 102 and/or the alarm monitor 104 are in communication with the remote nodes 304 via the aggregator nodes 302. Thus, messages sent from the network health manger 102 and/or the alarm monitor 104 to a particular remote node 304 may pass through the aggregator node 302 and any other remote nodes 304 along the path.

In one implementation, the aggregator node 302 routes a message from the network health manger 102 and/or the alarm monitor 104 to the particular remote node 304. For example, the aggregator node 302 may route a TL1 message using a target identifier (TID) of the particular remote node 304. In one implementation, the aggregator node 302 includes a table listing the remote nodes 304 connected to the aggregator node 302 and the target identifiers of those remote nodes 304. Upon receiving a message, the aggregator node 302 routes the message to the appropriate remote node 304 using the target identifier listed in the table. Similarly, the aggregator node 302 routes autonomous messages generated by the remote nodes 304 to the network health manger 102 and/or the alarm monitor 104.

In one implementation, in response to a network issue, the remote node 304 generates an autonomous message to report an alarm. The aggregator node 302 receives various autonomous messages from the remote nodes 304 connected to the aggregator node 302. In one implementation, the aggregator node 302 aggregates and sends messages containing alarm data to the network health manger 102 and/or the alarm monitor 104. Stated differently, each of the remote nodes 304 reports alarms through one or more of the aggregator nodes 302 to the network health manger 102 and/or the alarm monitor 104, and the aggregator node 302 collects and consolidates all the alarms prior to sending to the network health manger 102 and/or the alarm monitor 104.

Using the alarm data captured from the nodes 302, 304, the network health manger 102 and/or the alarm monitor 104 may generate a map of the subnetwork 300 with visual indicators signaling which of the nodes 302, 304 are in alarm. For example, the map may use color coding to differentiate between alarm statuses: green may indicate that no alarm is reported; yellow may indicate an alarm related to a network issue with a low level impairment such that service is unaffected; and red may indicate customer affecting alarms.

Figure 4:
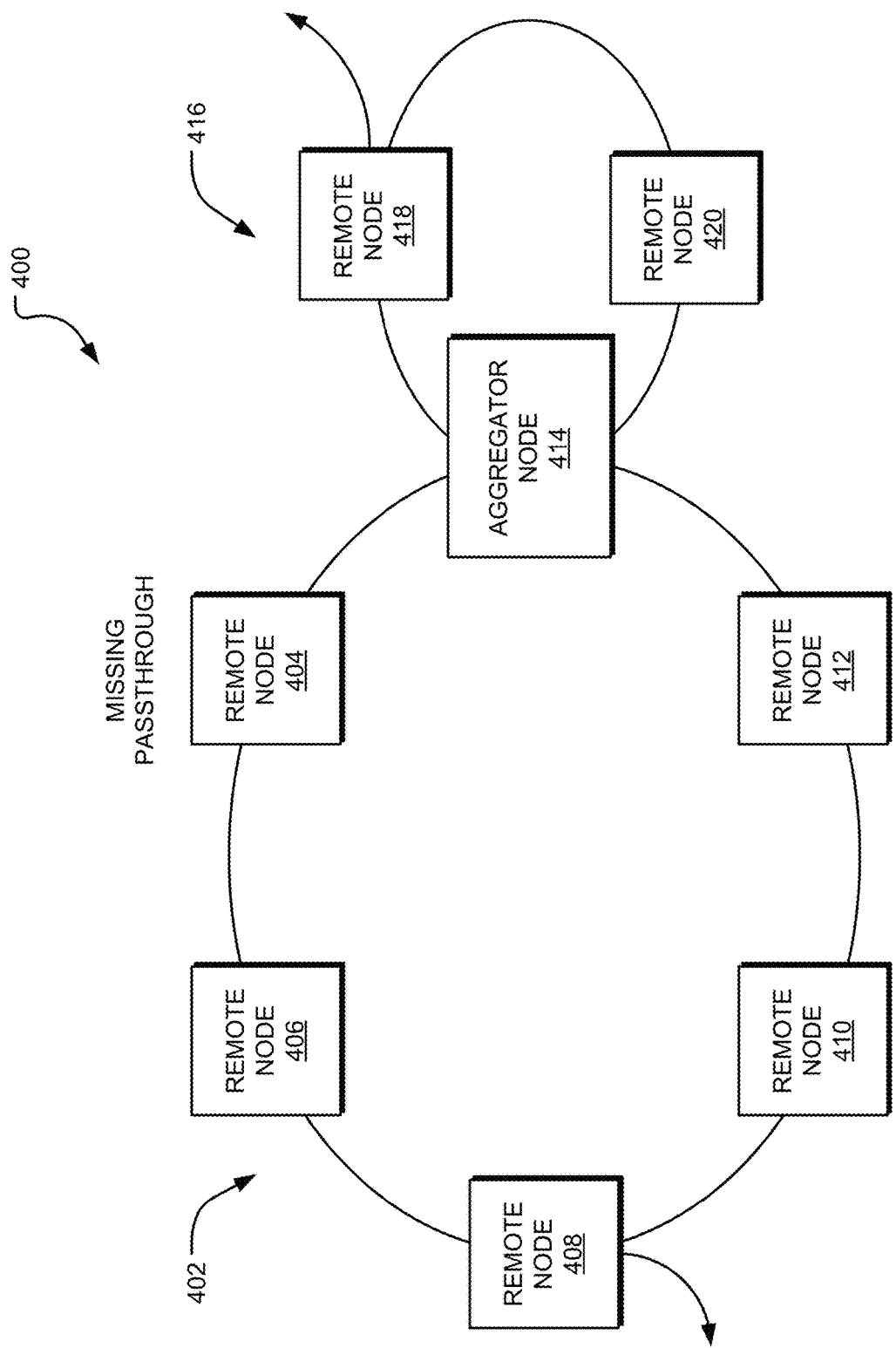
FIG. 4 shows an example carrier circuit with a node along the circuit path having a missing passthrough, triggering alarms.
Figure 5:
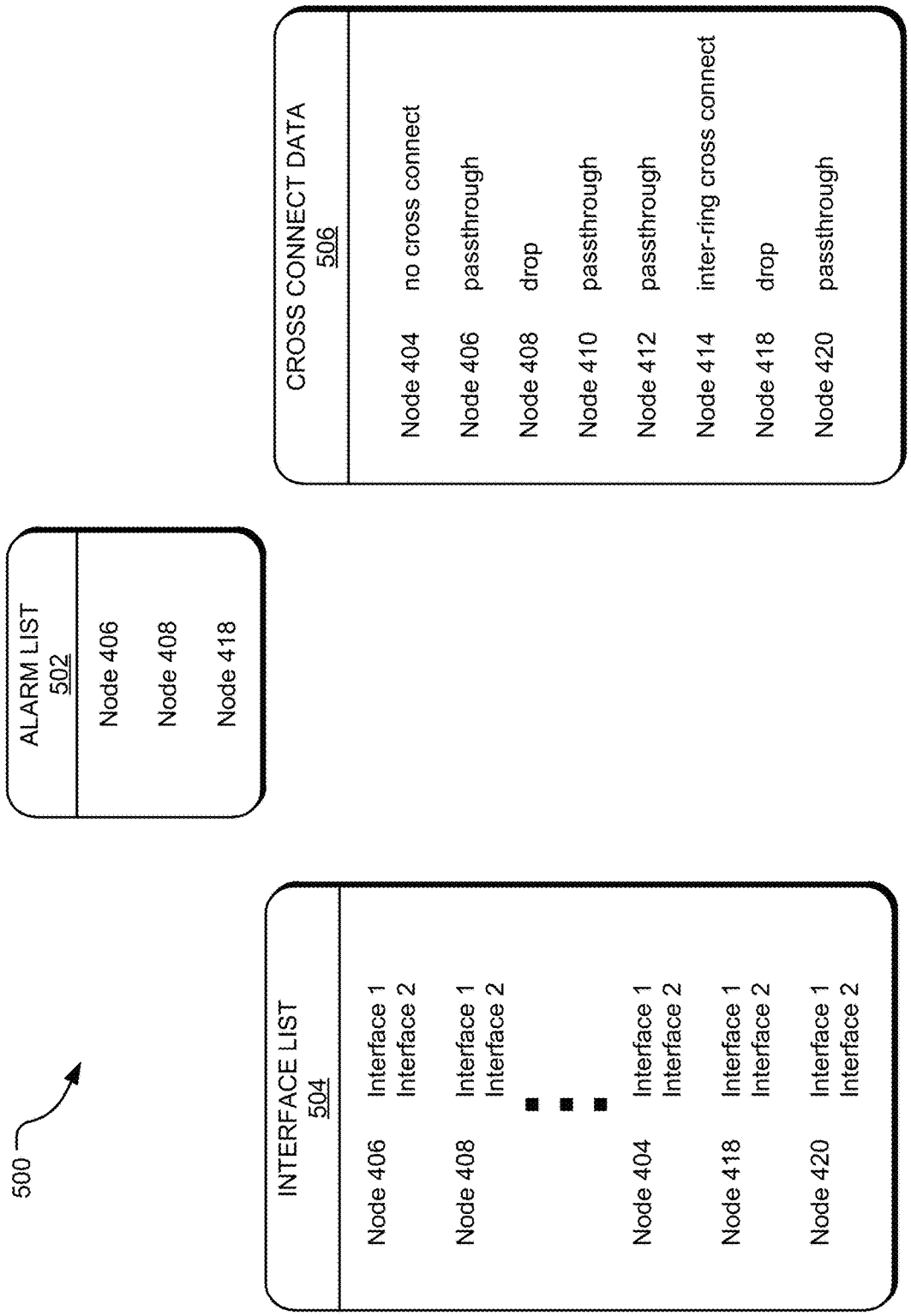
FIG. 5 illustrates data obtained by the network health manager based on a snapshot of the alarms triggered in FIG. 4 to generate network health data, including recommendations for repairing the missing passthrough.

For an illustrative example of alarm reduction and network health optimization, reference is made to FIGS. 4-5. FIG. 4 shows an example carrier circuit with a node along the circuit path having a missing passthrough, triggering alarms. FIG. 5 illustrates data 500 obtained by the network health manager based on a snapshot of the arms triggered in FIG. 4 to generate network health data, including recommendations for repairing the missing passthrough.

In one implementation, a carrier circuit 400 is arranged in a ring topology with a first ring 402 interconnected to a second ring 416 via an aggregator node 414. The first ring 402 includes a plurality of remote nodes 404-412 connected to the aggregator node 414, and the second ring 416 includes a plurality of remote nodes 418-420 connected to the aggregator node 414.

As can be understood from FIGS. 4-5, the circuit 400 is an example of a working circuit carrying service. For example, the remote node 418 may be configured to receive network traffic via a digital signal (e.g., DS3) channel from an origin point, and the signal is transmitted around the circuit path in both directions to the remote node 408, which selects the best of the signals for transmission to a termination point. If a cross connect is removed along the circuit path in one of the directions, network traffic may still deliverable via the other direction along the circuit path, so the circuit 400 may still be carrying service. However, any nodes downstream from the node with the missing cross connect will be in alarm state.

In the example of FIGS. 4-5, the remote node 404 is missing a passthrough cross connection. The passthrough of the remote node 404 receives and transmits a signal between the aggregator node 414 and the remote node 406. Due to the missing passthrough, the signal is not transmitted through the remote node 404, and consequently, the remote nodes 406, 408, and 418 are not receiving signals. In response to the lack of signal, the remote nodes 406, 408, and 418 generate autonomous messages containing alarm data, which are captured, aggregated, and sent to the network health manager 102 and/or the alarm monitor 104 by the aggregator node 414. The network health manager 102 thus receives an alarm list 502 including the remote nodes 406, 408, and 418.

In one implementation, the network health manager 102 determines which of the alarms on the list 502 has the highest priority. For example, customer affecting alarms may have a higher priority than alarms relating to impairments that do not affect service to a customer. In another example, higher priority alarms may correspond to alarms having a higher impact potential on the subnetwork (e.g., tickets that can clear multiple alarms in the subnetwork). Starting with an alarm that is higher level permits the network health manager 102 to collect and resolve all related alarms. In the example shown in FIGS. 4-5, the alarms of the remote nodes 406, 408, and 418 would all have the same priority because they have the same level and have the same impairment. The network health manager 102 may identify the alarm corresponding to the remote node 406 to discover related alarms.

In one implementation, the network health manager 102 obtains network data, including topology data, ring data, and cross connect data for the circuit 400. Circuits may contain hundreds of cross connects along virtual tributaries in a subnetwork. The network health manager traverses these tributaries to discover all the cross connects and their relationships, while tracking adjustments through time slots. Stated differently, the network health manager 102 queries each of the nodes in a circuit to capture network data, regardless of how many nodes or rings are involved.

To obtain network data for the circuit 400, the network health manager 102 queries the remote node 406 to discover neighbor nodes (e.g., the remote nodes 404 and 408) and then traverses the circuit path to query each of the nodes from the add point at the remote node 418 to the drop point at the remote node 408. The network data includes the topology data identifying optical interfaces deployed along the circuit path and how the interfaces relate to each other and the circuit 400. In one implementation, the network health manager 102 captures and parses the network data into a list of interfaces 504 deployed along the circuit path. The network data further includes cross connect data and ring data identifying the rings 402 and 416. For example, cross connect data for the aggregator node 414 indicates that the rings 402 and 416 are interconnected. For example, the network health manager 102 starts with the remote node 406 and traverses the circuit path identifying the remote node 408, followed by the remote nodes 410, 412, and 404. Each of these remote nodes 404-412 are added to the interface list 504. When the network health manager 102 queries the aggregator node 414, the ring 416 is identified, and the remote nodes 418 and 420 are added to the interface list 504, along with corresponding interfaces. Accordingly, the interface list 504 includes all of the interfaces associated with the path of the circuit 400 from source to destination.

To correlate any alarms related to the first alarm for the remote node 406, in one implementation, the network health manager 102 compares the alarm list 502 to the interface list 504. The remote nodes 408 and 418 are both listed in the alarm list 502 and the interface list 504, and as such, are identified as having alarms related to the alarm for the remote node 406. In one implementation, the network health manager 102 correlates the alarms for the remote nodes 406, 408, and 418 into a ticket or otherwise using a tag.

In one implementation, to identify a root cause of the related alarms, the network health manager 102 captures cross connect data 506 for each of the nodes in the circuit 400. The network health manager 102 sends messages to each of the nodes via the aggregator node 414, as detailed herein, and in response, the aggregator node 414 sends the cross connects data from each of the nodes. The cross connect data 506 may be associated with the related alarms, for example, using the tag or ticket. The cross connect data 506 provides an integrity of a circuit path through the nodes in the circuit 400. For example, the network health manager 102 may determine whether the circuit 400 is carrying service with two add/drop points (e.g., the remote nodes 418 and 408) and a circuit path between the two add/drop points, as well as that each of the nodes are capable of carrying service.

As shown in the example of FIGS. 4-5, the cross connect data 506 reveals that the remote node 404 has no cross connect, the remote node 406 has a passthrough, the remote node 408 has an add/drop, the remote nodes 410 and 412 have passthroughs, the aggregator node 414 has an inter-ring cross connect, the remote node 418 has an add/drop, and the remote node 420 has a passthrough. Using the cross connect data 506, the network health manager 102 determines that the circuit 400 is capable of carrying traffic and the remote node 404 is missing a passthrough. In one implementation, the network health manager 102 recommends adding the passthrough to the remote node 404, and the network health manager 102 may execute the recommendation automatically or in response to user input (e.g., approving the passthrough add). For example, the network health manager 102 may generate a resolution script with commands to add the passthrough and send the commands to the remote node 404 via the aggregator node 414. Adding the passthrough to the remote node 404 remedies the root cause of the alarms for the remote nodes 406, 408, and 418, thereby resolving the alarms for those nodes concurrently.

FIGS. 6-9 show example user interfaces generated by the network health manager 102 and/or the alarm monitor 104 and displayed in a browser window of the user device 108 through which access to and interactions with the alarm tickets, alarm data, network data, network health data, and other data are provided. It will be appreciated by those skilled in the art that such depictions are exemplary only and not intended to be limiting.

Figure 6:
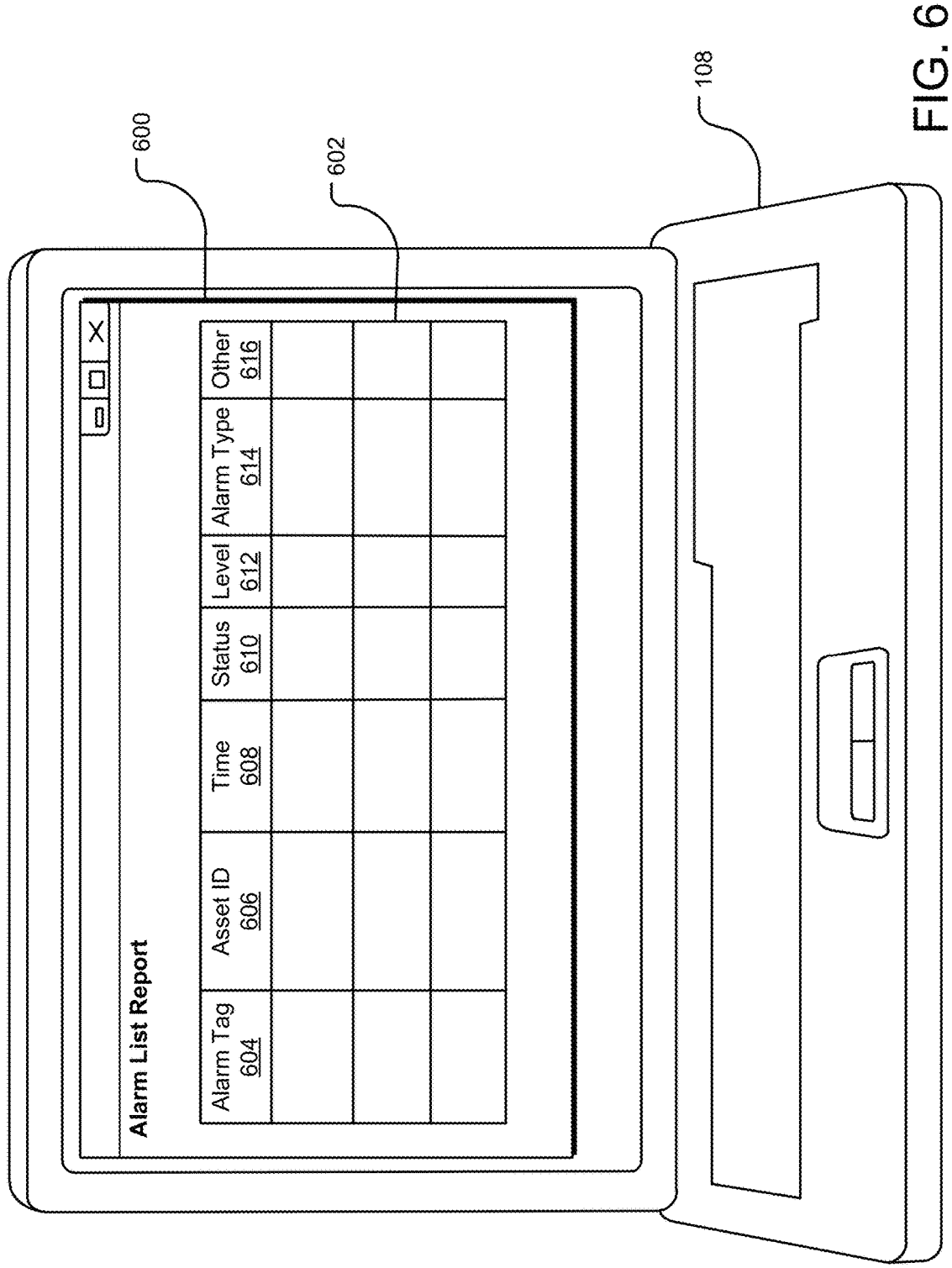
FIG. 6 shows an example alarm list report user interface providing alarm data for a subnetwork.

Turning first to FIG. 6, an example alarm list report user interface 600 providing alarm data for a subnetwork is shown. As described herein, alarm data for an entire subnetwork is captured, consolidated, and imported into an alarm list 602. In one implementation, the alarm list 602 includes an alarm tag 604 identifying a ticket for the alarm, an asset identifier 606 identifying the network element in alarm, an assert time 608 specifying the time at which the alarm was triggered, a status 610 of the network element (e.g., alarm, resolved, etc.), a level 612 of the asset indicating a bandwidth of the asset, an alarm type 614 (e.g., alarm insertion, failtosw, etc.), and other data 616, such as subnetwork identifiers, asset type, and/or the like. In one implementation, a master ticket is created using the alarm tag 604 for a first alarm, and related alarms are correlated into the master ticket using the alarm tag 604 for the first alarm.

Figure 7:
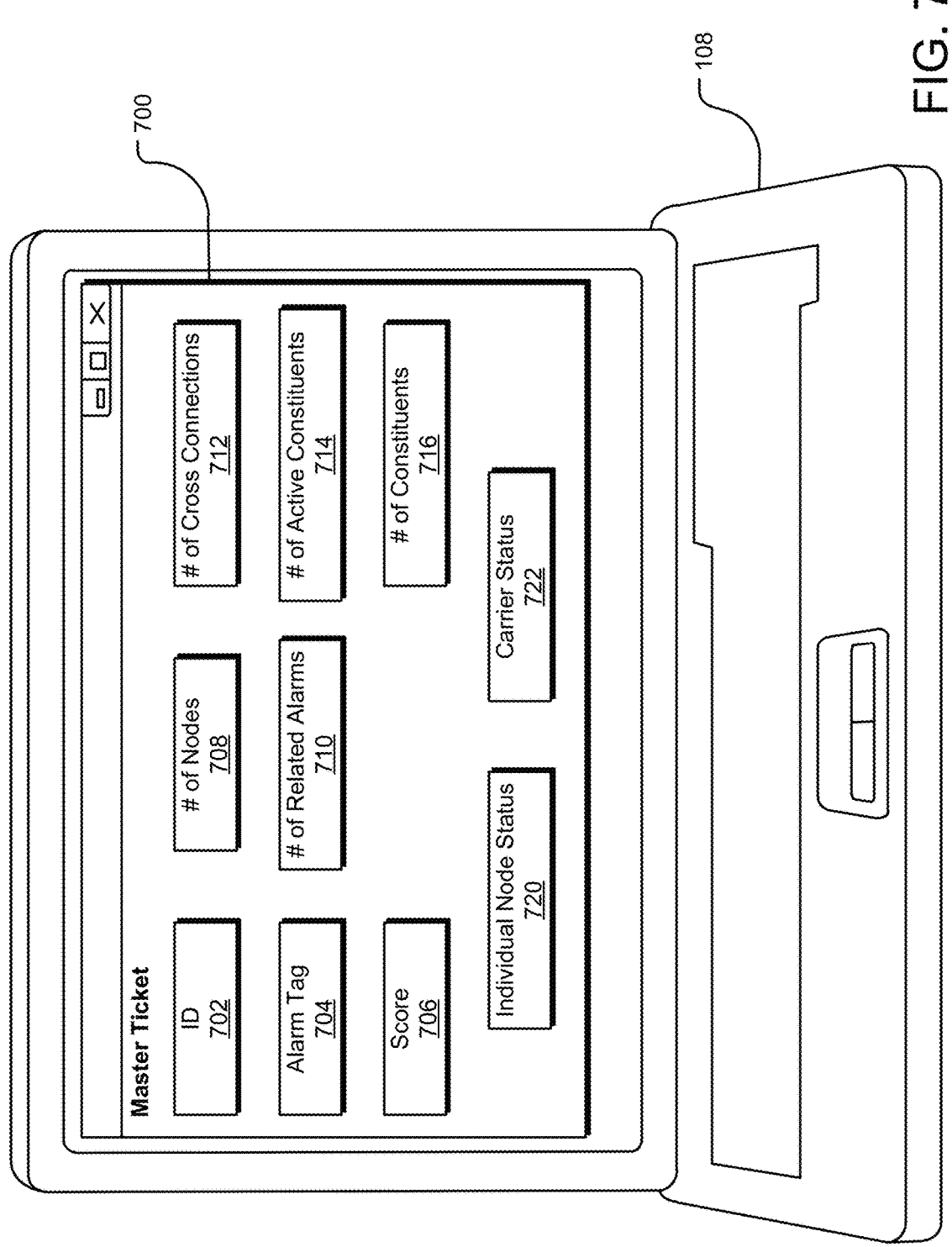
FIG. 7 depicts an example master ticket user interface detailing a status and integrity of the facilities causing related alarms.
Figure 8:
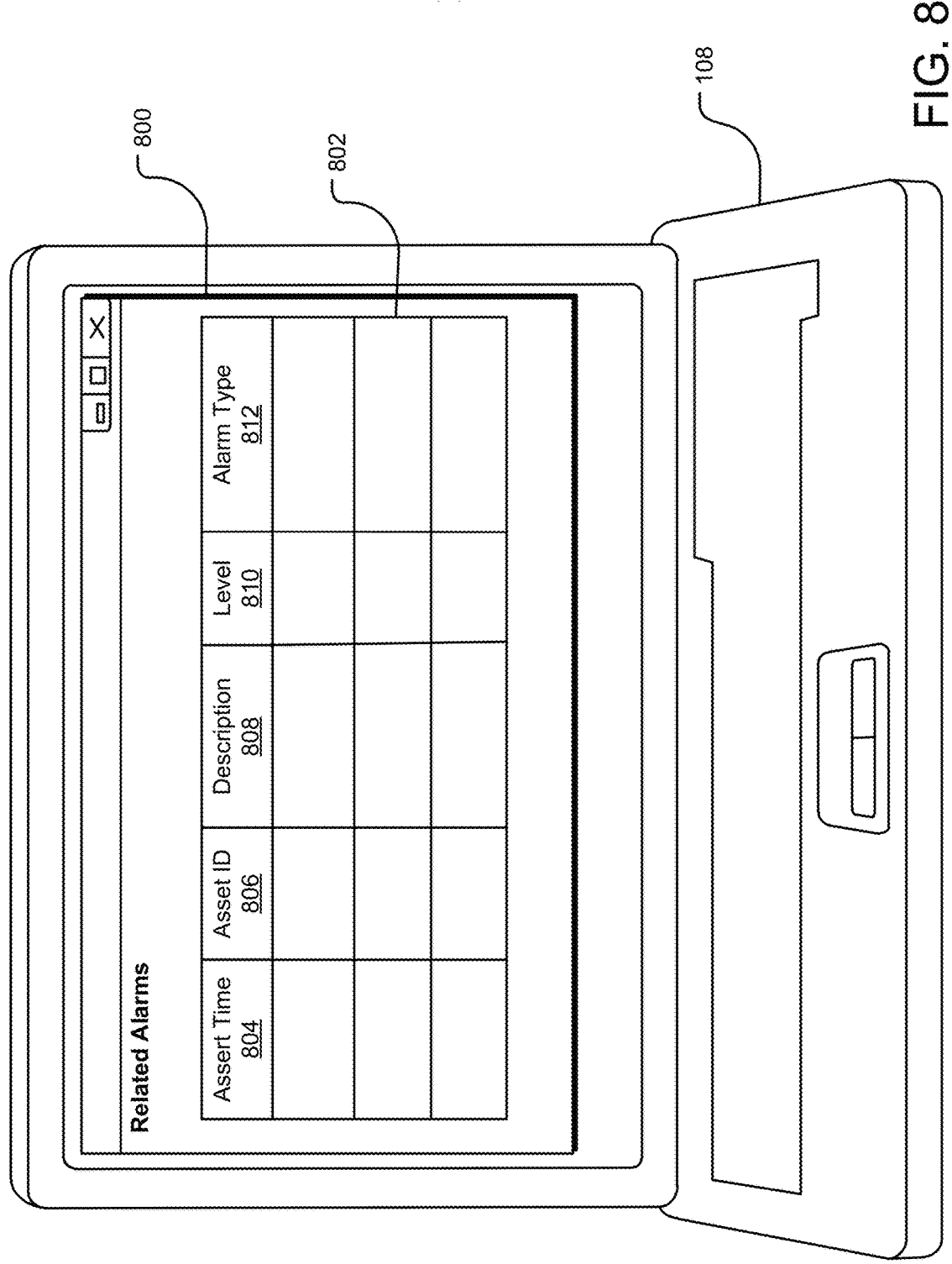
FIG. 8 shows an example related alarms user interface detailing the alarms related to the master ticket.

To resolve a master ticket with related alarms, a user is directed to a master ticket user interface 700 detailing a status and integrity of the facilities causing related alarms, an example of which is shown in FIG. 7. In one implementation, the master ticket includes an identifier 702 for the ticket, an alarm tag 704 (e.g., using the alarm tag 604 for a first alarm), a score 706 indicating a priority for resolving the ticket, a number of nodes 708 in the circuit associated with the master ticket, a number of related alarms 710 in the circuit, a number of cross connections 712 in the circuit, a number of active constituents 714 in a carrier, and a total number of constituents 716 in the carrier. This information may be determined using the network data, as described herein.

The master ticket 700 further details an integrity of the circuit and the individual interfaces with a carrier status 722 and an individual node status 720 for each of the constituents, respectively. In one implementation, a related alarms user interface 800 may detail the alarm data 802 related to the master ticket 700, including, without limitation, an alarm assert time 804 specifying a time at which an interface generated an alarm, an asset identifier 806 identifying the interface, a description 808 detailing information regarding the nature of the alarm (e.g., a circuit provisioning error), a level 810 of the interface indicating a bandwidth, and an alarm type 812.

Comparing the alarm data 802 to the carrier status 722 and the individual node status 720 provides information regarding a root cause of the related alarms for the master ticket 700. For example, the individual node status 720 for an interface may indicate that it is in use capable of delivering service, the carrier status 722 may indicate that the circuit for the interface is carrying service, and the alarm data 802 may identify the interface as being in alarm. In this case, the network health manager 102 may determine that there is no signal from the customer and generate recommendations for addressing the issue, thereby addressing all the alarms listed in the alarm interface 800 and reflected in the number of related alarms 710 concurrently. In this example, because the issue is not customer affecting, the score 706 may be lower, indicating a lower priority.

Conversely, with a network issue affecting customer service, such that the carrier status 722 provides that no active service is found and/or the individual node status 720 indicates that interfaces are incomplete with missing drops, the score 706 may be higher. In this example, the number of constituents 716 may be high with the number of active constituents 714 being significantly lower indicating that there are several circuit incapable of delivering service. After analyzing the network data and the alarm data, the network health manager 102 may determine that the alarms are associated with fragments of a signal that was improperly disconnected for a customer. Specifically, passthroughs were left in the subnetwork with drops being deleted, such that the circuit has no add/drop connections but several existing passthrough connections with the cross connections incapable of delivering service. The network health manager 102 thus determines that the circuit was improperly disconnected and recommends deleting the circuit in an alarm action user interface.

Figure 9:
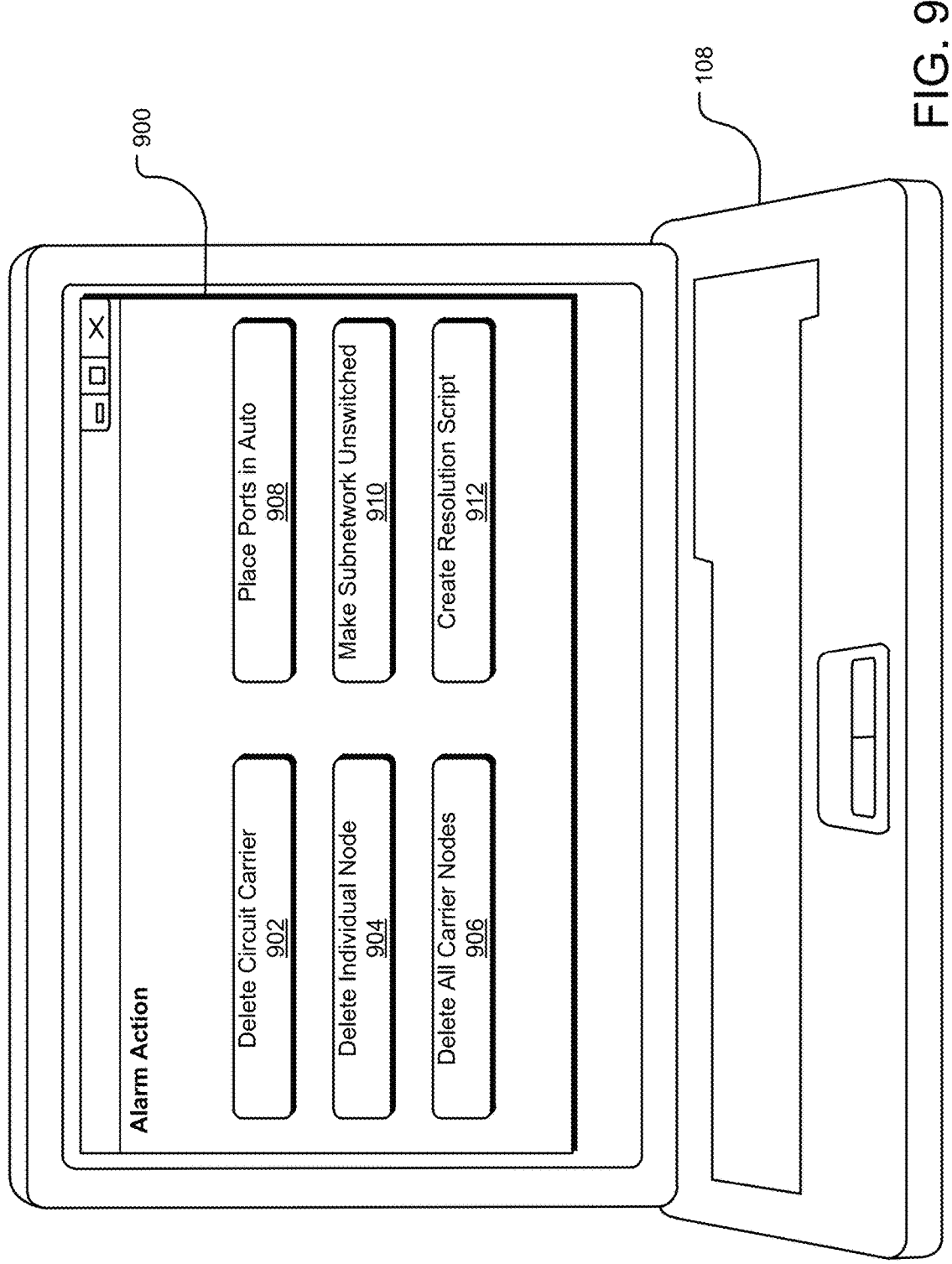
FIG. 9 depicts an example alarm action user interface providing options for addressing the related alarms.

FIG. 9 depicts an example alarm action user interface 900 providing options for addressing the related alarms. In one implementation, the alarm action 900 includes options to: delete a circuit carrier 902 to delete an entire circuit, delete one or more individual nodes 904 in a circuit while leaving the carrier in place, delete all carrier nodes 906 in a circuit, place one or more ports in auto 908, make a subnetwork unswitched 910, and create a resolution script 912. Selecting the delete circuit carrier option 902 may generate a window detailing the various cross connects that will be deleted with the circuit and asking a user to confirm prior to proceeding with the delete. In one implementation, after confirming to delete the circuit, the network health manager 102 loads the various cross connects associated with the circuit into a resolution script, which sends commands to all the nodes along the path of the circuit to delete the cross connects and therefore the circuit.

Figure 10:
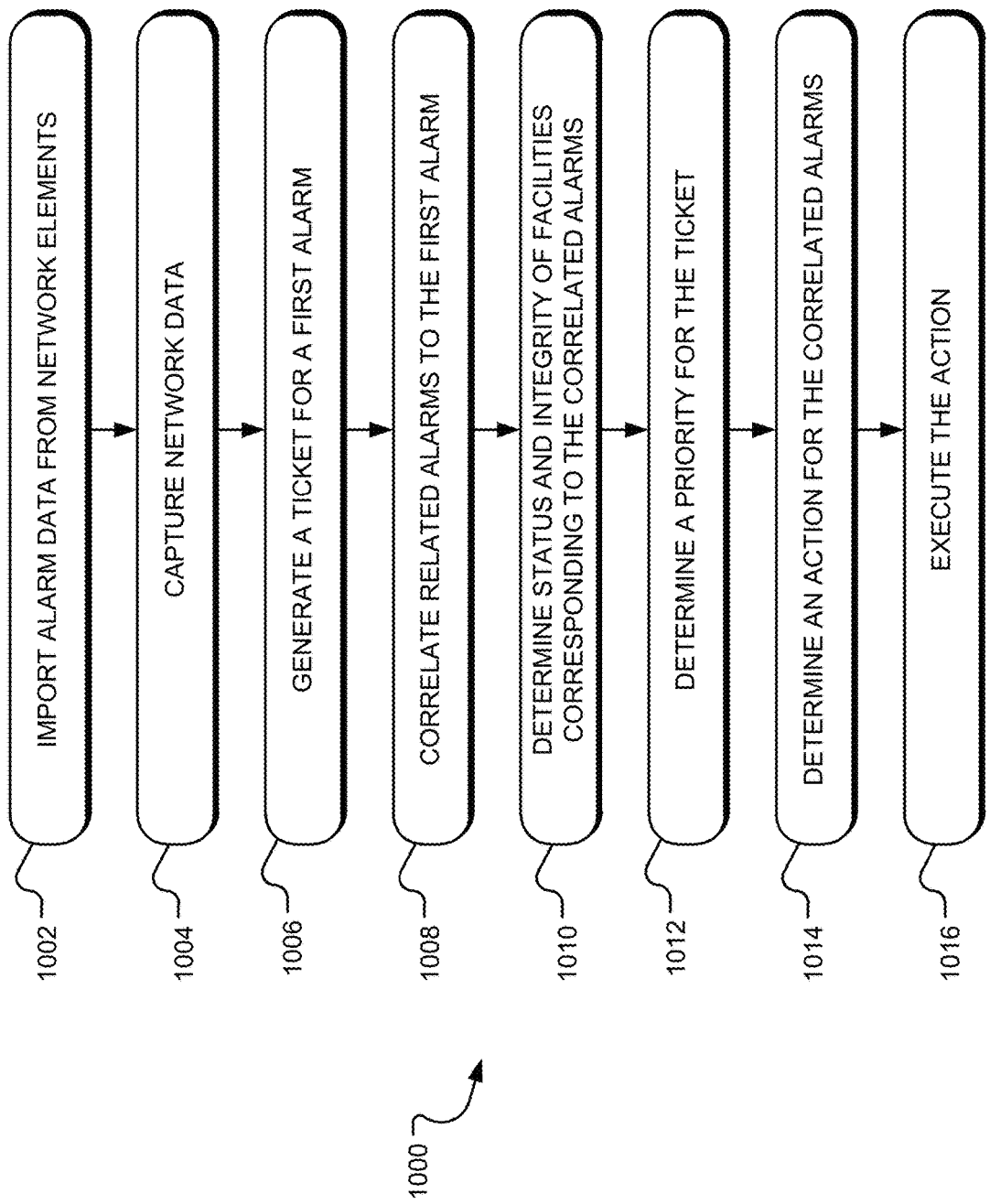
FIG. 10 illustrates example operations for identifying and correcting network issues in a subnetwork, thereby reducing the number of alarms.

Turning to FIG. 10, example operations 1000 for identifying and correcting network issues in a subnetwork, thereby reducing the number of alarms are illustrated. In one implementation, an operation 1002 imports alarm data from a plurality of network elements, and an operation 1004 captures network data for one or more of the network elements deployed along a circuit path. An operation 1006 generates a ticket for a first alarm for one of the network elements deployed along the circuit path, and an operation 1008 correlates related alarms to the first alarm. In one implementation, the operation 1008 correlates the alarms based on a comparison on an interface list detailing interfaces deployed along the circuit path with the alarm data. An operation 1010 determines a status and integrity of facilities corresponding to the correlated alarms. In one implementation, the operation 1010 utilizes cross connect data for the network elements deployed along the circuit path in determining the status and integrity. An operation 1012 determines a priority for the ticket, and an operation 1014 determines an action for the correlated alarms based on the priority. In one implementation, the operation 1014 uses the status and integrity of the network facilities in determining the action. An operation 1016 executes the action, automatically or in response to user input. In one implementation, the operation 1016 executes the action using a resolution script.

Figure 11:
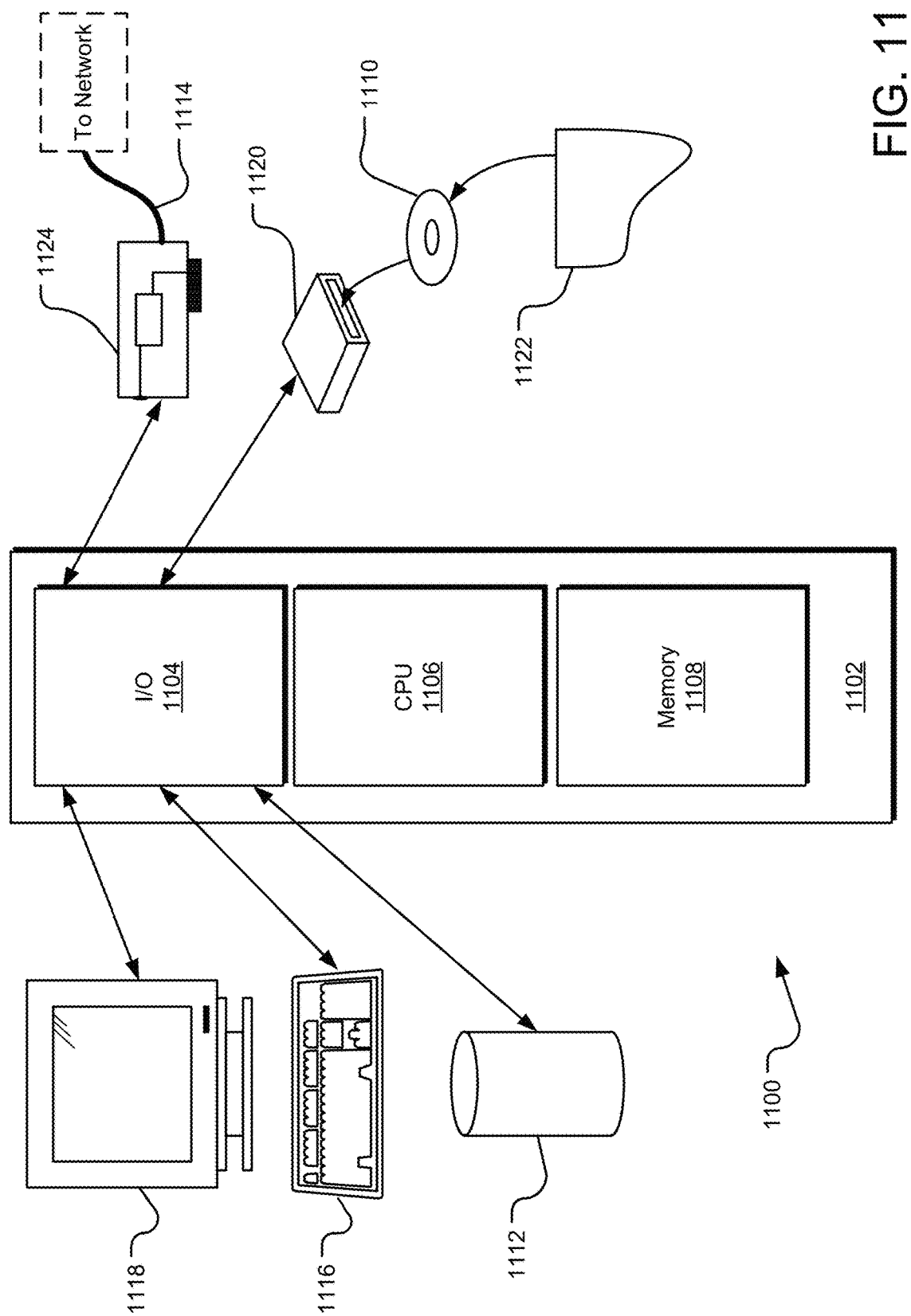
FIG. 11 is an example computing system that may be specifically configured to implement the various systems and methods discussed herein.

Referring to FIG. 11, a detailed description of an example computing system 1100 having one or more computing units that may implement various systems and methods discussed herein is provided. The computing system 1100 may be applicable to the user device 108, the server 112, or other computing devices. It will be appreciated that specific implementations of these devices may be of differing possible specific computing architectures not all of which are specifically discussed herein but will be understood by those of ordinary skill in the art.

The computer system 1100 may be a general computing system is capable of executing a computer program product to execute a computer process. Data and program files may be input to the computer system 1100, which reads the files and executes the programs therein. Some of the elements of a general purpose computer system 1100 are shown in FIG. 11 wherein a processor 1102 is shown having an input/output (I/O) section 1104, a Central Processing Unit (CPU) 1106, and a memory section 1108. There may be one or more processors 1102, such that the processor 1102 of the computer system 1100 comprises a single central-processing unit 1106, or a plurality of processing units, commonly referred to as a parallel processing environment. The computer system 1100 may be a conventional computer, a distributed computer, or any other type of computer, such as one or more external computers made available via a cloud computing architecture. The presently described technology is optionally implemented in software devices loaded in memory 1108, stored on a configured DVD/CD-ROM 1110 or storage unit 1112, and/or communicated via a wired or wireless network link 1114, thereby transforming the computer system 1100 in FIG. 11 to a special purpose machine for implementing the described operations.

The I/O section 1104 is connected to one or more user-interface devices (e.g., a keyboard 1116 and a display unit 1118), a disc storage unit 1112, and a disc drive unit 1120. In the case of a tablet or smart phone device, there may not be a physical keyboard but rather a touch screen with a computer generated touch screen keyboard. Generally, the disc drive unit 1120 is a DVD/CD-ROM drive unit capable of reading the DVD/CD-ROM medium 1110, which typically contains programs and data 1122. Computer program products containing mechanisms to effectuate the systems and methods in accordance with the presently described technology may reside in the memory section 1104, on a disc storage unit 1112, on the DVD/CD-ROM medium 1110 of the computer system 1100, or on external storage devices made available via a cloud computing architecture with such computer program products, including one or more database management products, web server products, application server products, and/or other additional software components. Alternatively, a disc drive unit 1120 may be replaced or supplemented by an optical drive unit, a flash drive unit, magnetic drive unit, or other storage medium drive unit. Similarly, the disc drive unit 1120 may be replaced or supplemented with random access memory (RAM), magnetic memory, optical memory, and/or various other possible forms of semiconductor based memories commonly found in smart phones and tablets.

The network adapter 1124 is capable of connecting the computer system 1100 to a network via the network link 1114, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as terminals, workstations, mobile phones, tablets or slates, multimedia consoles, gaming consoles, set top boxes, etc.

When used in a LAN-networking environment, the computer system 1100 is connected (by wired connection or wirelessly) to a local network through the network interface or adapter 1124, which is one type of communications device. When used in a WAN-networking environment, the computer system 1100 typically includes a modem, a network adapter, or any other type of communications device for establishing communications over the wide area network. In a networked environment, program modules depicted relative to the computer system 1100 or portions thereof, may be stored in a remote memory storage device. It is appreciated that the network connections shown are examples of communications devices for and other means of establishing a communications link between the computers may be used.

In an example implementation, the network health manager 102, the alarm monitor 104, alarm data, network data, network health data, tickets, a plurality of internal and external databases, source databases, and/or cached data on servers are stored as the memory 1108 or other storage systems, such as the disk storage unit 1112 or the DVD/CD-ROM medium 1110, and/or other external storage devices made available and accessible via a network architecture. Network outage tracker software and other modules and services may be embodied by instructions stored on such storage systems and executed by the processor 1102.

Some or all of the operations described herein may be performed by the processor 1102. Further, local computing systems, remote data sources and/or services, and other associated logic represent firmware, hardware, and/or software configured to control operations of the network health manager 102, the alarm monitor 104, the user devices 108, the server 112, and/or other computing units or components of the network environment 100. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 1102 and a user may interact with a GUI (e.g., interfaces 600 to 900) using one or more user-interface devices (e.g., the keyboard 1116, the display unit 1118, and the user devices 108) with some of the data in use directly coming from online sources and data stores. The system set forth in FIG. 11 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for alarm reduction, the method comprising:
   receiving an alarm list having alarm data captured from a plurality of remote nodes and consolidated at an aggregator node;
   identifying a first alarm from the alarm list, the first alarm corresponding to an optical interface deployed in a circuit of a subnetwork of a telecommunications network;
   discovering a topology associated with the optical interface by traversing a path of the circuit;
   generating an interface list based on the topology;
   identifying one or more alarms related to a root cause of the first alarm based on a comparison of the interface list to the alarm list;
   correlating the related alarms to the first alarm for concurrent resolution;
   generating a ticket for a non-service impacting event based on the correlated and related alarms, each of the correlated and related alarms associated with a network element deployed along the circuit path;
   obtaining cross connect data from each of the network elements;
   determining an integrity of the circuit path through the network elements using the cross connect data, including both determining a status of a carrier associated with the circuit path and determining a status of each of the network elements; and
   determining a priority for resolving the ticket based on the integrity of the circuit path through the network elements, the priority specifying an impact potential of the non-service impacting event corresponding to an amount of network assets recoverable on the subnetwork.

2. The method of claim 1, wherein the related alarms are correlated to the first alarm by tagging the related alarms with a tag assigned to the first alarm.

3. The method of claim 1, wherein the related alarms and the first alarm are correlated into a ticket.

4. The method of claim 1, wherein the remote nodes are multiplexers and the aggregator node is a gateway network element.

5. The method of claim 1, wherein the path of the circuit is traversed using one or more Transaction Language 1 commands.

6. The method of claim 1, wherein the alarm list is received from an alarm monitor.

7. The method of claim 1, wherein the interface list is generated by tracking each neighboring optical interface included in the topology.

8. The method of claim 1, wherein the related alarms are identified when the comparison of the interface list to the alarm list includes a match for a neighboring optical interface included in the topology.

9. One or more non-transitory tangible computer-readable storage media storing computer-executable instructions for performing a computer process on a computing system, the computer process comprising the method of claim 1.

10. A method for alarm reduction, the method comprising:
    generating a ticket for a non-service impacting event based on a plurality of correlated alarms, each of the correlated alarms associated with a network element deployed along a circuit path in a subnetwork of a telecommunications network;
    obtaining cross connect data from each of the network elements;
    determining an integrity of the circuit path through the network elements using the cross connect data, including both determining a status of a carrier associated with the circuit path and determining a status of each of the network elements; and
    determining a priority for resolving the ticket based on the integrity of the circuit path through the network elements, the priority specifying an impact potential of the non-service impacting event corresponding to an amount of network assets recoverable on the subnetwork.

11. The method of claim 10, wherein the status of the carrier indicates whether the carrier is carrying service.

12. The method of claim 10, wherein the status of each of the network elements indicates whether the circuit path is capable of delivering service.

13. The method of claim 10, wherein the impact potential further corresponds to a level of network service remediation.

14. One or more non-transitory tangible computer-readable storage media storing computer-executable instructions for performing a computer process on a computing system, the computer process comprising the method of claim 13.

15. A system for alarm reduction, the system comprising:
    one or more databases storing an alarm list and an interface list, the alarm list having alarm data captured from a plurality of remote nodes and consolidated at an aggregator node, the interface list generated based on a topology associated with an optical interface; and
    a network health manager executable by at least one computing unit in communication with the one or more databases, the network health manager configured to identify one or more alarms related to a root cause of a first alarm corresponding to the optical interface based on a comparison of the interface list to the alarm list and configured to correlate the related alarms to the first alarm for concurrent resolution, wherein the network health manager is further configured to determine a priority for resolving a ticket for a non-service impacting event based on the correlated and related alarms, each of the correlated and related alarms associated with a network element deployed along a circuit path in a subnetwork, the priority specifying an impact potential of the non-service impacting event corresponding to an amount of network assets recoverable on the subnetwork and determined based on an integrity of the circuit path through the network elements determined using cross connect data obtained from each of the network elements, including both of a status of a carrier associated with the circuit path and a status of each of the network elements.

16. The system of claim 15, wherein the related alarms are correlated to the first alarm using a tag.

17. The system of claim 15, wherein the related alarms and the first alarm are correlated into the ticket.

18. The system of claim 15, wherein the remote nodes are multiplexers and the aggregator node is a gateway network element.

19. The system of claim 15, wherein the topology is discovered using one or more Transaction Language 1 commands.

20. The system of claim 15, wherein the alarm list is received from an alarm monitor in communication with the aggregator node and the network health manager.

21. The system of claim 15, wherein the related alarms are correlated to the first alarm using the topology.

22. The system of claim 21, wherein the related alarms are further correlated to the first alarm using the cross connect data.

23. A system for alarm reduction, the system comprising:
a network health manager executable by at least one computing unit and configured to determine a priority for resolving a ticket for a non-service impacting event based on a plurality of correlated alarms, each of the correlated alarms associated with a network element deployed along a circuit path in a subnetwork, the priority specifying an impact potential of the non-service impacting event corresponding to an amount of network assets recoverable on the subnetwork and determined based on an integrity of the circuit path through the network elements determined using cross connect data obtained from each of the network elements, including both of a status of a carrier associated with the circuit path and a status of each of the network elements.

24. The system of claim 23, wherein the status of the carrier indicates whether the carrier is carrying service.

25. The system of claim 23, wherein the status of each of the network elements indicates whether the circuit path is capable of delivering service.

26. The system of claim 23, wherein the impact potential further corresponds to a level of network service remediation.

* * * * *